March 29, 1955
T. W. HALLERBERG
2,705,318
INDICATING MEANS FOR WARNING LIGHTS
Filed Dec. 23, 1952
Fig.1.
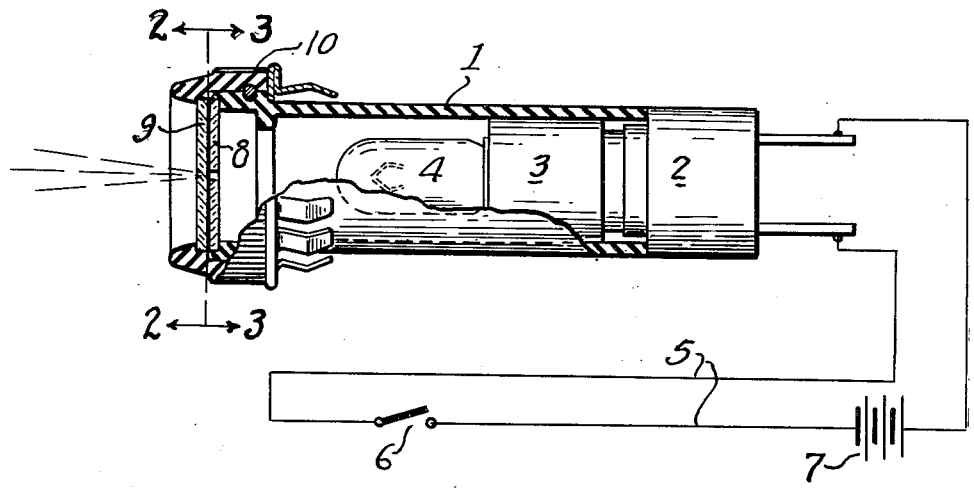
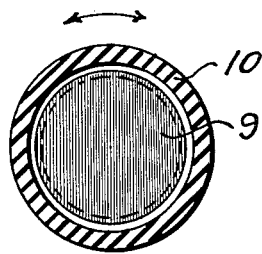
Fig.2.
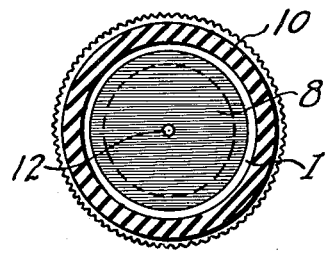
Fig.3.
INVENTOR
Theodore W. Hallerberg
BY
ATTORNEYS

United States Patent Office 2,705,318
Patented Mar. 29, 1955

2,705,318

INDICATING MEANS FOR WARNING LIGHTS

Theodore W. Hallerberg, Los Angeles, Calif.

Application December 23, 1952, Serial No. 327,617

3 Claims. (Cl. 340—381)

This invention relates particularly to means used in connection with adjustable warning lights, wherein superposed polarized filters are employed to control the intensity of the signal to indicate if the light is on when the filters have been adjusted to an extent to render it difficult to determine such fact under certain operating conditions.

The invention is especially valuable for use in connection with warning lights used to indicate the operating conditions of various devices important to the proper operation, for instance, of an airplane, whereby to indicate if the warning light is on when dimmed to an extent to render such fact difficult to determine, as in daylight.

In airplane flying, an aviator before taking a plane up for a night mission is required to test the warning lights to make certain that the warning lamps are not burned out and at the same time to pre-select the warning light intensity he desires when and if a warning should be given. This light value may, for instance, be 10% of full brightness, the full brightness intensity being such as to be highly annoying and distracting when the outside light is very dim. In event of failure of a condition for which a warning is to be given, the light will show the dim light. Upon completion of the mission, the aviator returns to his base and the electrical system is turned off, usually leaving the warning light system in its adjusted dimmed condition. Should the same plane be next taken out for daylight flying, the night setting of the warning light would be too dim for use as a warning signal in daylight so that it is necessary for the aviator to adjust the warning light to say 80% to 100% of full brightness to compensate for the outside light.

The primary object of the present invention is to provide a warning light that is capable of giving a warning signal of undiminished intensity even when previously adjusted to a dimmed condition without impairing its ability to function without annoyance to an operator who desires only a dimmed signal.

Other objects and advantages of the invention will be apparent from the following detailed description, and from the accompanying drawings illustrating one embodiment thereof, in which—

Fig. 1 is a side view, with parts in central longitudinal section, of a warning light means in connection with an operating circuit, and Figs. 2 and 3 are sections taken, respectively, on the dotted line 2—2 and 3—3 in Fig. 1 looking in the direction of the respective arrows.

The invention is shown in connection with an electric warning signal device suitable for mounting on the instrument panels of airplanes, automobiles, and the like, for indicating when some associated operating part or parts fail to properly function. This device comprises a body member 1 of tubular form and usually of insulating material, with the rear end closed by a removable plug 2 having a socket part 3 at its inner end in which an electric lamp 4 may be mounted, as well understood in the art. The customary electric socket terminals (not shown) are disposed in any suitable electric circuit 5 that is bridged by the lamp 4 and includes a control switch 6 and a current source, as for instance a battery 7.

The outer end of the body member 1 is closed by two polarized filter screens or lenses 8 and 9 disposed in close parallel relation, the inner one being fixed to the body member, while the other, 9, is fixed to a collar 10 that is mounted for rotatable adjustment on the end of the body member, whereby one filter lens may be turned relative to the other, thus effecting a dimming of the projected light from zero to 100%, as may be desired. It is preferable to color at least one of the filter screens. Devices of this description are common and nothing per se is claimed therefor.

In the use of such warning devices, it is exceedingly difficult, if not impossible, to determine by looking at the lens end thereof, when the device is in a substantially or completely dimmed condition, if the warning lamp 4 is on. This is an objectionable condition as it is highly desirable, particularly in successive flying of night and day missions by the same plane, to be able to tell at a glance if the lamp 4 of the device is on and in proper working condition without regard to the adjustment of the polarized screens.

The novelty of this invention resides in the provision in at least one of the polarized screens 8, 9, preferably the inner one, of a small aperture 12, which may not be more than a pin prick in size, so as to permit only a small pencil of light to pass therethrough from the lamp 4 when lighted. This aperture is preferably, but not necessarily, disposed at the axis of the filters. This is particularly desirable if the aperture is located in the adjustable filter, as otherwise the aperture will have a revoluble movement during adjustment. It is preferred to make the aperture in the inner filter so that the outer filter and its mounting can act as a dust cover for the lamp assembly.

It is apparent that, upon an adjustment of one polarized filter screen relative to the other, the changing of the position of the polarized lines of one screen relative to the other will cause a dimming of the light rays passing therethrough, which dimming becomes complete when lines of polarization of the two screens are substantially at right angles to each other, thus making it possible to completely blank out the projected light from the lamp 4 by such adjustment. Now, if one of the polarizing screens is provided with a small aperture, an attendant or pilot can readily determine by merely looking at the device if the warning light is on, even though it is in effect completely blanked out, for, if the light is on, a small pencil of light will show through the aperture. While this is a simple improvement, it is found in practice to be a highly important one.

I wish it understood that my invention is not limited to any specific construction, arrangement or form of the parts, as it is capable of numerous modifications and changes without departing from the spirit of the claims.

What I claim is:

1. In a warning device of the class described wherein the light from a warning lamp is projected through a set of polarizing filter screens which are relatively adjustable to control the intensity of the light passing therefrom, the provision in at least one of said filter screens of a small aperture through which a pencil of light of constant brightness may be directed from the warning lamp irrespective of the adjusted position of said polarizing screens.

2. A combination as called for in claim 1 wherein the adjustment of one screen relative to the other is rotational.

3. In a warning device of the class described wherein a warning lamp is mounted in a tubular member that is closed at its light-projecting end by a pair of cooperating polarized light filtering screens with one rotatably adjustable relative to the other to control the intensity of the light passing therethrough, the provision in at least one of said filter screens of an axially disposed aperture through which a small pencil of light of constant brightness is projected from the warning lamp when lighted irrespective of the adjustment of said screens.

References Cited in the file of this patent

UNITED STATES PATENTS

| | | |
|---|---|---|
| 1,913,937 | Loeffler | June 13, 1933 |
| 2,379,542 | Rempt | July 3, 1942 |
| 2,388,449 | Sundt et al. | Nov. 6, 1945 |
| 2,423,322 | Hurley | July 1, 1947 |
| 2,454,280 | Hardesty | Nov. 23, 1948 |
| 2,511,010 | Rohr | June 13, 1950 |
| 2,586,869 | Sculthorpe | Feb. 26, 1952 |